US010089216B2

(12) United States Patent
Varadarajan

(10) Patent No.: US 10,089,216 B2
(45) Date of Patent: Oct. 2, 2018

(54) AUTOMATICALLY DETERMINING WHETHER A PAGE OF A WEB SITE IS BROKEN DESPITE ELEMENTS ON THE PAGE THAT MAY CHANGE

(71) Applicant: Shape Security, Inc., Mountain View, CA (US)

(72) Inventor: Subramanian Varadarajan, San Jose, CA (US)

(73) Assignee: SHAPE SECURITY, INC., Mountain View, CA (US)

( * ) Notice: Subject to any disclaimer, the term of this patent is extended or adjusted under 35 U.S.C. 154(b) by 768 days.

(21) Appl. No.: 14/320,403

(22) Filed: Jun. 30, 2014

(65) Prior Publication Data

US 2015/0378968 A1  Dec. 31, 2015

(51) Int. Cl.
*G06F 17/00* (2006.01)
*G06F 11/36* (2006.01)
*G06F 17/22* (2006.01)

(52) U.S. Cl.
CPC ........ *G06F 11/368* (2013.01); *G06F 17/2247* (2013.01)

(58) Field of Classification Search
CPC ........................... G06F 17/2211; G06F 11/368
USPC ......................................... 715/237, 243, 246
See application file for complete search history.

(56) References Cited

U.S. PATENT DOCUMENTS

| | | | |
|---|---|---|---|
| 6,266,684 B1 * | 7/2001 | Kraus | G06F 17/24 715/209 |
| 6,957,229 B1 | 10/2005 | Dyor | |
| 7,424,720 B2 | 9/2008 | Chagoly | |
| 7,480,385 B2 | 1/2009 | Weber | |
| 7,707,223 B2 | 4/2010 | Zubenko et al. | |
| 7,836,425 B2 | 11/2010 | Rubin et al. | |
| 7,870,610 B1 | 1/2011 | Mitchell | |
| 7,895,653 B2 | 2/2011 | Calo et al. | |
| 8,020,193 B2 | 9/2011 | Bhola et al. | |
| 8,170,020 B2 | 5/2012 | Oliver et al. | |
| 8,200,958 B2 | 6/2012 | Coppola et al. | |

(Continued)

FOREIGN PATENT DOCUMENTS

| | | |
|---|---|---|
| WO | WO2013091709 | 6/2013 |
| WO | WO 2017/074622 | 5/2017 |

OTHER PUBLICATIONS

U.S. Appl. No. 14/055,714, filed Oct. 16, 2013, Office Action, dated Mar. 16, 2015.

(Continued)

*Primary Examiner* — Matthew Ludwig
(74) *Attorney, Agent, or Firm* — Wei & Sleman, LLP

(57) ABSTRACT

In an embodiment, a method comprises rendering a first image of a first user interface based on a first set of instructions; rendering a second image of a second user interface based on a second set of instructions; generating a first mask comprising a plurality of points, wherein each point in the first mask indicates whether a first point in the first image and a second point in the second image are different; rendering a third image of a third user interface based on a third set of instructions, wherein the first set of instructions are different than the third set of instructions and the first image is different than the third image; determining that the first image is equivalent to the third image based on the first image, the first mask, and the third image.

30 Claims, 7 Drawing Sheets

(56) References Cited

U.S. PATENT DOCUMENTS

| | | |
|---|---|---|
| 8,220,054 B1 | 7/2012 | Lu |
| 8,266,202 B1 | 9/2012 | Colton et al. |
| 8,543,379 B1* | 9/2013 | Michelsen .......... G06F 17/2705 |
| | | 704/9 |
| 8,584,233 B1 | 11/2013 | Yang |
| 8,713,631 B1 | 4/2014 | Pavlyushchik |
| 9,075,990 B1 | 7/2015 | Yang |
| 9,104,878 B1 | 8/2015 | Khairetdinov |
| 9,275,222 B2 | 3/2016 | Yang |
| 9,338,143 B2 | 5/2016 | Hansen |
| 9,356,954 B2 | 5/2016 | Zhou |
| 9,456,050 B1 | 9/2016 | Lepeska |
| 9,563,929 B1 | 2/2017 | Sokolowski |
| 9,639,699 B1 | 5/2017 | Kurupati |
| 9,686,300 B1 | 6/2017 | Kurupati |
| 9,712,561 B2 | 7/2017 | Zhou |
| 9,906,544 B1 | 2/2018 | Kurupati |
| 2002/0016918 A1 | 2/2002 | Tucker |
| 2005/0172338 A1 | 8/2005 | Sandu |
| 2005/0198099 A1 | 9/2005 | Motsinger |
| 2005/0204348 A1 | 9/2005 | Horning |
| 2005/0216770 A1 | 9/2005 | Rowett |
| 2006/0015941 A1 | 1/2006 | McKenna |
| 2006/0212932 A1 | 9/2006 | Patrick |
| 2006/0230288 A1 | 10/2006 | Fox |
| 2007/0074169 A1 | 3/2007 | Chess |
| 2007/0083813 A1 | 4/2007 | Lui |
| 2007/0083933 A1 | 4/2007 | Venkatapathy |
| 2007/0266149 A1 | 11/2007 | Cobb |
| 2008/0222736 A1 | 9/2008 | Bodaei et al. |
| 2008/0250310 A1 | 10/2008 | Chen |
| 2009/0144829 A1 | 6/2009 | Grigsby et al. |
| 2009/0193497 A1 | 7/2009 | Kikuchi |
| 2009/0193513 A1 | 7/2009 | Agarwal et al. |
| 2009/0249310 A1 | 10/2009 | Meijer et al. |
| 2009/0282062 A1 | 11/2009 | Husic |
| 2010/0088404 A1 | 4/2010 | Mani |
| 2010/0106611 A1 | 4/2010 | Paulsen |
| 2010/0142382 A1 | 6/2010 | Jungck et al. |
| 2010/0180346 A1 | 7/2010 | Nicolson |
| 2010/0218253 A1 | 8/2010 | Andrew |
| 2010/0257354 A1 | 10/2010 | Johnston et al. |
| 2010/0262780 A1 | 10/2010 | Mahan et al. |
| 2010/0272094 A1 | 10/2010 | Byard |
| 2010/0287132 A1 | 11/2010 | Hauser |
| 2011/0173526 A1 | 7/2011 | Schwarzbauer |
| 2011/0231305 A1 | 9/2011 | Winters |
| 2011/0296391 A1 | 12/2011 | Gass et al. |
| 2011/0320816 A1 | 12/2011 | Yao |
| 2012/0022942 A1 | 1/2012 | Holloway et al. |
| 2012/0096116 A1 | 4/2012 | Mislove et al. |
| 2012/0124372 A1 | 5/2012 | Dilley et al. |
| 2012/0167161 A1 | 6/2012 | Kim |
| 2012/0174225 A1 | 7/2012 | Shyamsunder |
| 2012/0254727 A1 | 10/2012 | Jain |
| 2012/0254845 A1 | 10/2012 | Yi |
| 2012/0255006 A1 | 10/2012 | Aly |
| 2013/0031037 A1 | 1/2013 | Brandt |
| 2013/0091582 A1* | 4/2013 | Chen ...................... G06Q 10/10 |
| | | 726/26 |
| 2013/0117731 A1* | 5/2013 | Lesuer ................. G06F 11/3672 |
| | | 717/125 |
| 2013/0232234 A1 | 9/2013 | Kapur et al. |
| 2013/0273882 A1 | 10/2013 | Walsh |
| 2014/0040051 A1 | 2/2014 | Ovick |
| 2014/0089786 A1 | 3/2014 | Hashmi |
| 2014/0245394 A1 | 8/2014 | Abuelsaad |
| 2014/0263637 A1* | 9/2014 | Roger .................... G07C 13/02 |
| | | 235/386 |
| 2014/0289830 A1 | 9/2014 | Lemaster |
| 2014/0310392 A1 | 10/2014 | Ho |
| 2015/0058992 A1 | 2/2015 | El-Moussa |
| 2015/0067031 A1 | 3/2015 | Acharya |
| 2015/0067853 A1 | 3/2015 | Amrutkar |
| 2015/0235362 A1* | 8/2015 | Ghosh .................. G06T 7/0012 |
| | | 382/128 |
| 2015/0262183 A1 | 9/2015 | Gervais |
| 2015/0309813 A1 | 10/2015 | Patel |
| 2015/0339213 A1* | 11/2015 | Lee ..................... G06F 11/3664 |
| | | 717/125 |
| 2015/0378876 A1* | 12/2015 | Ji ........................ G06F 11/3688 |
| | | 714/38.1 |
| 2016/0005029 A1 | 1/2016 | Ivey |
| 2016/0342793 A1 | 11/2016 | Hidayat |
| 2017/0118241 A1 | 4/2017 | Call |
| 2017/0132469 A1* | 5/2017 | Yiu ..................... G06K 9/00718 |
| 2017/0235954 A1 | 8/2017 | Kurupati |
| 2017/0293748 A1 | 10/2017 | Kurupati |
| 2018/0152436 A1 | 5/2018 | Yang |

OTHER PUBLICATIONS

U.S. Appl. No. 14/470,082, filed Aug. 27, 2014, Office Action, dated Aug. 28, 2015.
U.S. Appl. No. 14/542,994, filed Nov. 17, 2014, Office Action, dated Dec. 14, 2015.
U.S. Appl. No. 14/602,038, filed Jan. 21, 2015, Office Action, dated Apr. 22, 2016.
U.S. Appl. No. 14/570,466, filed Dec. 15, 2014, Office Action, dated Apr. 21, 2016.
U.S. Appl. No. 14/596,944, filed Jan. 14, 2015, Office Action, dated May 12, 2016.
U.S. Appl. No. 14/470,082, filed Aug. 27, 2014, Office Action, dated Jun. 24, 2016.
U.S. Appl. No. 14/055,704, filed Oct. 16, 2013, Interview Summary, dated Apr. 9, 2015.
U.S. Appl. No. 14/055,704, filed Oct. 16, 2013, Final Office Action, dated Apr. 9, 2015.
Matsunaka et al., "Detecting and Preventing Drive-By Download Attack via Participative Monitoriing of the Web", Information Security, dated Jul. 26, 2013, 8th Asia Joint Conference, pp. 48-55.
CTFR, dated Aug. 14, 2017, re: Marc. R. Hansen, U.S. Appl. No. 15/148,139, filed May 6, 2016.
CTNF, dated Aug. 11, 2017, re: Oscar H. Steele III, U.S. Appl. No. 15/224,985, filed Aug. 1, 2016.
NOA, dated Aug. 29, 2017, re: Siying Yang, U.S. Appl. No. 15/052,951, filed Feb. 25, 2016.
NOA, dated Aug. 29, 2017, re: Roger S. Hoover, U.S. Appl. No. 14/713,493, filed May 15, 2015.
CTFR, dated Sep. 5, 2017, re: Siying Yang, U.S. Appl. No. 14/925,547, filed Oct. 28, 2015.
CTFR, dated Oct. 5, 2017, re: Justin D. Call, U.S. Appl. No. 14/922,436, filed Oct. 26, 2015.
NOA, dated Oct. 11, 2017, re: James D. Call, U.S. Appl. No. 14/822,287, filed Aug. 10, 2015.
NOA, dated Oct. 18, 2017, re: Roger S. Hoover, U.S. Appl. No. 14/470,082, filed Aug. 27, 2014.
NOA, dated Oct. 10, 2017, re: Roger S. Hoover, U.S. Appl. No. 14/713,493, filed May 15, 2015.
NOA, dated Feb. 16, 2017, re: Justin D. Call, U.S. Appl. No. 14/822,287, filed Aug. 10, 2015.
NOA, dated Mar. 10, 2017, re: Roger S. Hoover, U.S. Appl. No. 14/470,082, filed Aug. 27, 2014.
CTNF, dated Mar. 10, 2017, re: Justin D. Call, U.S. Appl. No. 14/922,436, filed Oct. 26, 2015.
CTNF, dated Mar. 9, 2017, re: Siying Yang, U.S. Appl. No. 14/925,547, filed Oct. 28, 2015.
NOA, dated Mar. 16, 2017, re: Siying Yang, U.S. Appl. No. 15/052,951, filed Feb. 25, 2016.
CTFR, dated Apr. 9, 2015, re: Justin Call, U.S. Appl. No. 14/055,704, filed Oct. 16, 2013.
CTNF, dated Dec. 4, 2014, re: Justin Call, U.S. Appl. No. 14/055,704, filed Oct. 16, 2013.
CTNF, dated Dec. 30, 2013, re: Justin Call, U.S. Appl. No. 14/055,704, filed Oct. 16, 2013.
CTFR, dated Apr. 22, 2014, re: Justin Call, U.S. Appl. No. 14/055,704, filed Oct. 16, 2013.

(56) References Cited

OTHER PUBLICATIONS

CTFR, dated 2015-09-25, re: Marc Hansen, U.S. Appl. No. 14/055,714, filed Oct. 16, 2013.
CTNF, dated Mar. 16, 2015, re: Marc Hansen, U.S. Appl. No. 14/055,714, filed Oct. 16, 2013.
NOA, dated Jan. 13, 2016, re: Marc Hansen, U.S. Appl. No. 14/055,714, filed Oct. 16, 2013.
CTNF, dated Apr. 10, 2014, re: Oscar Steele, U.S. Appl. No. 14/160,105, filed Jan. 21, 2014.
NOA, dated Oct. 17, 2014, re: Oscar Steele, U.S. Appl. No. 14/160,105, filed Jan. 21, 2014.
CTNF, dated Sep. 1, 2015, re: Ariya Hidayat, U.S. Appl. No. 14/293,895, filed Jun. 2, 2014.
NOA, dated Mar. 30, 2016, re: Ariya Hidayat, U.S. Appl. No. 14/293,895, filed Jun. 2, 2014.
CTNF, dated Feb. 22, 2017, re: Subramanian Varadarajan, U.S. Appl. No. 14/320,403, filed Jun. 30, 2014.
CTNF, dated Oct. 9, 2014, re: Siying Yang, U.S. Appl. No. 14/321,172, filed Jul. 1, 2014.
NOA, dated Mar. 30, 2015, re: Siying Yang, U.S. Appl. No. 14/321,172, filed Jul. 1, 2014.
CTNF, dated Jun. 24, 2016, re: Roger Hoover, U.S. Appl. No. 14/470,082, filed Aug. 27, 2014.
CTNF, dated Aug. 28, 2015, re: Roger Hoover, U.S. Appl. No. 14/470,082, filed Aug. 27, 2014.
CTNF, dated Dec. 1, 2016, re: Oscar Steele, U.S. Appl. No. 14/481,663, filed Sep. 9, 2014.
CTNF, dated Jan. 2, 2015, re: Timothy Peacock, U.S. Appl. No. 14/503,346, filed Sep. 30, 2014.
NOA, dated Apr. 10, 2015, re: Timothy Peacock, U.S. Appl. No. 14/503,346, filed Sep. 30, 2014.
CTNF, dated Apr. 14, 2015, re: Oscar Steele, U.S. Appl. No. 14/542,994, filed Nov. 17, 2014.
NOA, dated Mar. 28, 2016, re: Oscar Steele, U.S. Appl. No. 14/542,994, filed Nov. 17, 2014.
CTFR, dated Dec. 28, 2016, re: Siying Yang, U.S. Appl. No. 14/570,466, filed Dec. 15, 2014.
CTNF, dated Apr. 21, 2016, re: Siying Yang, U.S. Appl. No. 14/570,466, filed Dec. 15, 2014.
NOA, dated Dec. 7, 2016, re: Carl Schroeder, U.S. Appl. No. 14/596,944, filed Jan. 14, 2015.
CTNF, dated May 12, 2016, re: Carl Schroeder, U.S. Appl. No. 14/596,944, filed Jan. 14, 2015.
CTNF, dated Apr. 22, 2016, re: Justin Call, U.S. Appl. No. 14/602,038, filed Jan. 21, 2015.
NOA, dated Sep. 19, 2016, re: Justin Call, U.S. Appl. No. 14/602,038, filed Jan. 21, 2015.
CTNF, dated Oct. 7, 2016, re: Roger Hoover, U.S. Appl. No. 14/713,493, filed May 15, 2015.
NOA, dated Oct. 23, 2015, re: Siying Yang, U.S. Appl. No. 14/790,738, filed Jul. 2, 2015.
CTNF, dated Jul. 18, 2016, re: Justin Call, U.S. Appl. No. 14/822,287, filed Aug. 10, 2015.
CTNF, dated Oct. 7, 2016, re: Siying Yang, U.S. Appl. No. 15/052,951, filed Feb. 25, 2016.
NOA, dated Mar. 29, 2017, re: Siying Yang, U.S. Appl. No. 15/052,951, filed Feb. 25, 2016.
NOA, dated Apr. 11, 2017, re: Siying Yang, U.S. Appl. No. 15/052,951, filed Feb. 25, 2016.
CTNF, dated Dec. 16, 2016, re: Marc Hansen, U.S. Appl. No. 15/148,139, filed May 6, 2016.
NOA, dated May 22, 2017, re: Roger S. Hoover, U.S. Appl. No. 14/713,493, filed May 15, 2015.
CTNF, dated Jun. 2, 2017, re: Ariya Hidayat, U.S. Appl. No. 15/224,978, filed Aug. 1, 2016.
NOA, dated Jun. 30, 2017, re: Roger S. Hoover, U.S. Appl. No. 14/713,493, filed May 15, 2015.
NOA, dated Jun. 9, 2017, re: Carl Schroeder, U.S. Appl. No. 14/596,944, filed Jan. 14, 2015.
NOA, dated Jun. 20, 2017, re: Roger S. Hoover, U.S. Appl. No. 14/470,082, filed Aug. 27, 2014.
NOA, dated Jun. 20, 2017, re: Siying Yang, U.S. Appl. No. 15/052,951, filed Feb. 25, 2016.
International Search Report, dated Feb. 16, 2017, PCT/US16/53472.
International Search Report, dated Dec. 30, 2016, PCT/US16/53392.
International Search Report, dated Aug. 14, 2014, PCT/US14/27805.
International Search Report, dated Jul. 18, 2014, PCT/US14/23897.
CTNF, dated Oct. 19, 2017, re: Wesley Hales, U.S. Appl. No. 15/011,237, filed Jan. 29, 2016.
CTFR, dated Dec. 14, 2017, re: Subramanian Varadarajan, U.S. Appl. No. 14/320,403, filed Jun. 30, 2014.
NOA, dated Jan. 16, 2018, re: Justin D. Call, U.S. Appl. No. 14/822,287, filed Aug. 10, 2015.
CTFR, dated Feb. 23, 2018, re: Wesley Hayes, U.S. Appl. No. 15/011,237, filed Jan. 29, 2016.
NOA, dated May 3, 2018, re: Subramanian Varadarajan, U.S. Appl. No. 14/320,403, filed Jun. 30, 2014.
CTNF, dated May 3, 2018, re: Marc R. Hansen, U.S. Appl. No. 15/148,139, filed May 6, 2016.
CTNF, dated Jun. 7, 2018, re: Siying Yang, U.S. Appl. No. 14/925,547, filed Oct. 28, 2015.
CTFR, dated Jun. 6, 2018, re: Oscar H. Steele III, U.S. Appl. No. 15/224,985, filed Aug. 1, 2016.
CTNF, dated Jul. 12, 2018, re: Justin D. Call, U.S. Appl. No. 14/922,436, filed Oct. 26, 2015.

\* cited by examiner

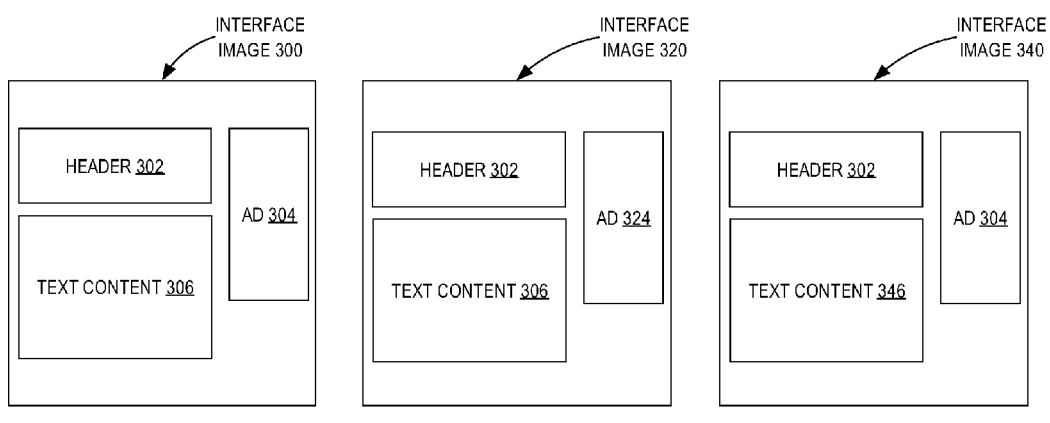

AUTOMATICALLY DETERMINING WHETHER A PAGE OF A WEB SITE IS BROKEN DESPITE ELEMENTS ON THE PAGE THAT MAY CHANGE

FIELD OF THE DISCLOSURE

The present disclosure generally relates to determining whether a user interface is broken, and relates more specifically to determining whether a web page is visually broken after the web page is modified.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Web sites are comprised of one or more web pages. Each web page may include instructions that define a visual user interface to display to a user using a client computer.

Web site administrators may release a new version of a web page that is intended to improve functionality, but not intended to visually break the appearance of the web page. Visually breaking a web page may mean visually changing the web page in a way that was not intended. For example, an administrator of a web site may include a new library in a page. The administrator may intend for the new library to cause the web page to stream data rather than poll for data, but not intend the library to cause the client computer to hide a logo. If a browser on a client computer executes the instructions in the web page, which includes the new library, and in response does not display the logo, then the web page is considered to be "broken" or "visually broken". Alternatively, a computer system may modify a web page for purposes of improving security aspects of the page or resistance to attack by malicious code, and the modifications may inadvertently cause the web page to be broken or visually broken.

Automatically determining whether a new version of a web page visually breaks the web page may be difficult. Simply comparing a before image of the web page to an after image of the web page may cause false errors. For example, a web page may include instructions to retrieve and display a different ad each time the page is presented. If an administrator causes a computer to compare a before image with a first ad to an after image with a second ad, then the administrator may receive a false error. Even though the ad in the before image may be different than the ad in the after image, changing the ad does not visually break the page because the administrator intends for the ad to change.

A web page may be displayed differently based on many factors. For example, an administrator may include instructions in a web page, which when executed by a browser, renders the web page differently based on the size of the browser window on a display. Also for example, a web page that displays news may include instructions, which when executed by a browser, render different news articles over time. Thus, automatically determining whether a web page is visually broken may be difficult.

SUMMARY

The appended claims may serve as a summary of the invention.

BRIEF DESCRIPTION OF THE DRAWINGS

In the drawings:

FIG. 3A, FIG. 3B, FIG. 3C each illustrate block diagrams of a rendered image of a page, in an example embodiment.

DETAILED DESCRIPTION

Figure 1:
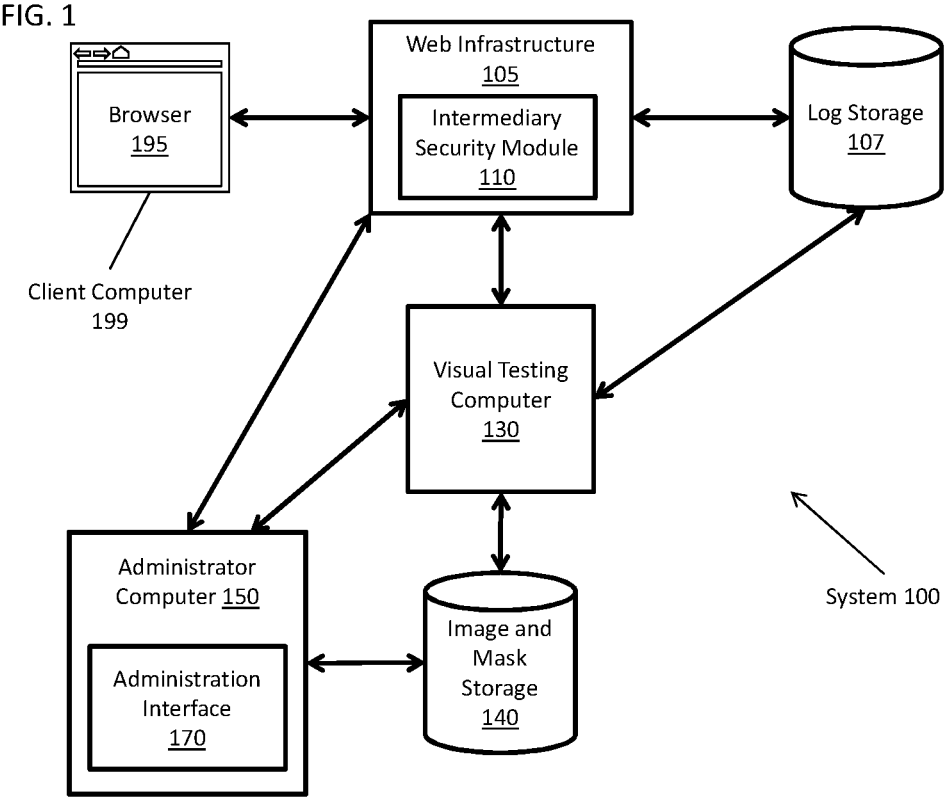
FIG. 1 illustrates a system for determining whether one or more pages are visually broken, in an example embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
    2.0 Example Network Topology
        2.1 Web Infrastructure
            2.1.1 Intermediary Security Module
        2.2 Visual Testing Computer
        2.3 Administrator Computer
        2.4 Browser
    3.0 Process Overview
        3.1 Determining Whether Page is Visually Broken
            3.1.1 Generating a mask
            3.1.2 Determining Whether a Page is Visually Broken using the Mask
            3.1.3 Updating the Mask
        3.2 Automatically Generating a Plurality of Masks and Determining which Pages are Visually Broken
            3.2.1 Rendering one or more Images of a Plurality of Pages
            3.2.2 Generating a Plurality of Masks
            3.2.3 Training a Model to Classify Pages and/or one or more Rendered Images of a Page
            3.2.4 Rendering one or more Images of a Plurality of Modified Pages
            3.2.5 Selecting a Mask for each Rendered Image of a Page based on the Model
            3.2.6 Determining Whether a Modified Page is Broken based on the one or more Rendered Images of the Modified Page 3.2.7 Automatically Updating one or more Masks 3.2.8 Modifying the Behavior of the Web Infrastructure 4.0 Implementation Mechanisms—Hardware Overview 5.0 Other Aspects of Disclosure 1.0 General Overview In an embodiment, a method comprises rendering a first image of a first user interface based on a first set of instructions; rendering a second image of a second user interface based on a second set of instructions; generating a first mask comprising a plurality of points, wherein each point in the first mask indicates whether a first point in the first image and a second point in the second image are different; rendering a third image of a third user interface based on a third set of instructions, wherein the first set of instructions are different than the third set of instructions and the first image is different than the third image; determining that the first image is equivalent to the third image based on the first image, the first mask, and the third image.

In an embodiment, the method comprises applying the first mask to the first image to produce a first stenciled image; applying the first mask to the third image to produce a second stenciled image; wherein determining that the first image is equivalent to the third image is based on determining that the first stenciled image is not different than the second stenciled image.

In an embodiment, the method comprises rendering a plurality of images, wherein each image in the plurality of images is based on a corresponding parameter set, of a plurality of parameter sets, wherein each parameter set of the plurality of parameter sets comprises of one or more parameters; generating a plurality of masks that include the first mask, wherein each mask in the plurality of masks is based on a subset of images of the plurality of images, and images in the subset of images have matching parameter sets; training a model based on each mask in the plurality of masks and each parameter set associated with each image in the subset of images that the mask is based on; wherein rendering the third image is based on a third parameter set; wherein determining that the first image is equivalent to the third image comprises classifying the third image, based on the model and the third parameter set, as belonging to the subset of images that the first mask is based on.

In an embodiment, the method comprises rendering a fourth image of a fourth user interface based on a fourth parameter set and a fourth set of instructions, wherein the first set of instructions are different than the fourth set of instructions and the first image is different than the fourth image; classifying the fourth image, using the model and the fourth parameter set, as belonging to the subset of images that the first mask is based on, and in response: determining that the first image is not equivalent to the fourth image based on the first image, the first mask, and the fourth image; in response, indicating that the first user interface and the fourth user interface are visually different.

While each of the drawing figures illustrates a particular embodiment for purposes of illustrating a clear example, other embodiments may omit, add to, reorder, and/or modify any of the elements shown in the drawing figures. Furthermore, while the instructions discussed in one or more example embodiments are HTML, CSS, and/or JavaScript instructions, in other embodiments, the instructions need not be HTML, CSS, and/or JavaScript instructions.

2.0 Example Network Topology

One or more systems and methods are discussed herein to efficiently and/or automatically determine whether a page, or user interface defined by the page, is visually broken based on one or more masks applied to one or more rendered images of the page. The one or more masks may be used to remove regions in the one or more images that are allowed, intended, and/or expected to change. Each resulting image may be referred to as a "stenciled image". Comparing stenciled images of a page may reduce the number of false errors when determining whether a modification to the web page visually breaks the page.

For purposes of illustrating a clear example, assume that each time an image of a page is rendered a different ad is displayed in a particular region of the image. After applying a mask to each image, the particular region in each image may be removed and/or or replaced by a removed region in the resulting stenciled image. Even though two rendered images of the same page include two different ads in the particular region, the two images may be determined to be the same or "equivalent", because the corresponding stenciled images, which include the removed regions, but not the ads, may be the same. Furthermore, the page may be determined not be visually broken if the stenciled images are the same.

A "removed region" in a stenciled image may be represented in many ways. For example, the one or more values that correspond to a removed region in a stenciled image may be assigned a particular color, such as black. Additionally or alternatively, the one or more values that correspond to a removed region in a stenciled image may be assigned a color and/or value that indicates the region is transparent. Additionally or alternatively, the one or more values that correspond to a removed region in a stenciled image may be zero and/or null. Additionally or alternatively, a data structure that represents the stenciled image may be updated to indicate that the one or more values that correspond to the removed region should not be compared with a region of another image or stenciled image. Accordingly, "removing a region" in an image may mean replacing the region with a removed region in the corresponding stenciled image.

"Rendering a page" or "rendering an image of a page" may comprise executing one or more of the instructions a page comprises and/or references and generating an image of the interface defined by the page. However, rendering a page need not include displaying the image on a display. As discussed in detail herein, an image of a page may be rendered and compared to other rendered images. One or more of the images may, but need not be, displayed on a display.

A page may be a set of instructions that define one or more objects and/or operations in an interface that may be visually displayed to a user. A web page may be a page sent or received over a web protocol, such as HTTP and/or SPDY. The instructions in a page may include one or more standard web-based programming languages, such as HTML, CSS, and/or JavaScript. Additionally or alternatively, the instructions in a page may comprise standard and/or proprietary languages and/or codes. A page may comprise instructions statically stored in one or more files and/or dynamically generated by a server computer. A page may comprise one or more instructions, and/or one or more sets of instructions, included by reference. A page may be a subpage and/or one or more elements of another page. For example, a page may comprise a document object model and/or hierarchy. A subpage may comprise one or more objects and/or sub-hierarchy of the hierarchy. A subpage may be stored and/or downloaded as part of a page. Additionally or alternatively, a subpage may be stored and/or downloaded separately and/or asynchronously.

FIG. 1 illustrates a system for determining whether one or more pages are visually broken, in an example embodiment. System 100 includes web infrastructure 105, client computer 199, visual testing computer 130, image and mask storage 140, and administrator computer 150 distributed across a plurality of interconnected networks. While each of the components listed above are illustrated as if running on a separate, remote computer from each other, one or more of the components listed above may be part of and/or executed on the same computer. For example, visual testing computer 130, image and mask storage 140, web infrastructure 105, and/or administrator computer 150 may be executed on the same computer, local area network, and/or wide area network.

A "computer" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. Any reference to "a computer" herein may mean one or more computers, unless expressly stated otherwise.

2.1 Web Infrastructure

Web infrastructure 105 may be one or more server computers that receive requests for data from users, such as a user using browser 195. In an embodiment, web infrastructure 105 may send and receive data with a browser through intermediary security module 110. For example, web infrastructure 105 may be one or more web servers serving pages or web pages. In response to a request for a web page, web infrastructure 105 may send the requested page to browser 195, through intermediary security module 110.

Web infrastructure 105 may generate logs and store the logs in log storage 107. The logs may describe requests for one or more pages from one or more browsers and/or client computers. For example, log storage 107 may include data describing a request sent to web infrastructure 105 from browser 195 for a page that corresponds with a URL and one or more parameters. The data may also describe one or more attributes of the client computer and/or browser that made the request. For example, the data may indicate a browser with a particular type and/or version made a request for a particular page. Additionally or alternatively, the data may indicate that the browser was running on a particular client computer connected to a display with particular dimensions. Additionally or alternatively, the data may indicate that the browser's window occupied particular dimensions on the display. Additionally or alternatively, the data may indicate any other factors about the browser and/or client computer that made the request.

2.1.1 Intermediary Security Module

Intermediary security module 110 may intercept a page sent from web infrastructure 105, modify the page and send the modified page to browser 195. Omitting, adding to, reordering, and/or modifying instructions in a page may be referred to as "modifying the page". Intermediary security module 110 may be a security module that modifies pages according to one or more security protocols. For example, intermediary security module 110 may intercept a page, parse and/or execute one or more of the instructions in the page, and generate a modified page according to a polymorphic protocol and/or another security protocol defined by an administrator. Additionally or alternatively, intermediary security module 110 may modify the object identifiers in a page, include one or more additional source code and/or executable libraries, and/or modify a page in any other way.

Intermediary security module 110 may be a proxy server for web infrastructure 105. Additionally or alternatively, intermediary security module 110 may be hardware and/or software physically and/or logically positioned between a router and web infrastructure 105, such that requests and/or data sent to, and/or sent from, web infrastructure 105 over one or more protocols may be intercepted by intermediary security module 110. For example, intermediary security module 110 may be a software module that is executed by a web server in web infrastructure 105.

2.2 Visual Testing Computer

Visual testing computer 130 may receive pages generated by web infrastructure 105 and/or intermediary security module 110, render one or more images of the pages, generate one or more masks, determine whether the pages are visually broken, notify an administrator using administrator computer 150, and/or perform one or more other methods and/or operations discussed herein.

Visual testing computer 130 may request one or more pages from web infrastructure 105. For example, visual testing computer 130 may read requests from log storage 107, and make similar requests to web infrastructure 105. Additionally or alternatively, visual testing computer 130 may make a request to web infrastructure 105 through intermediary security module 110. Additionally or alternatively, visual testing computer 130 may select whether to request a page from web infrastructure directly and/or through intermediary security module 110.

Figure 7:
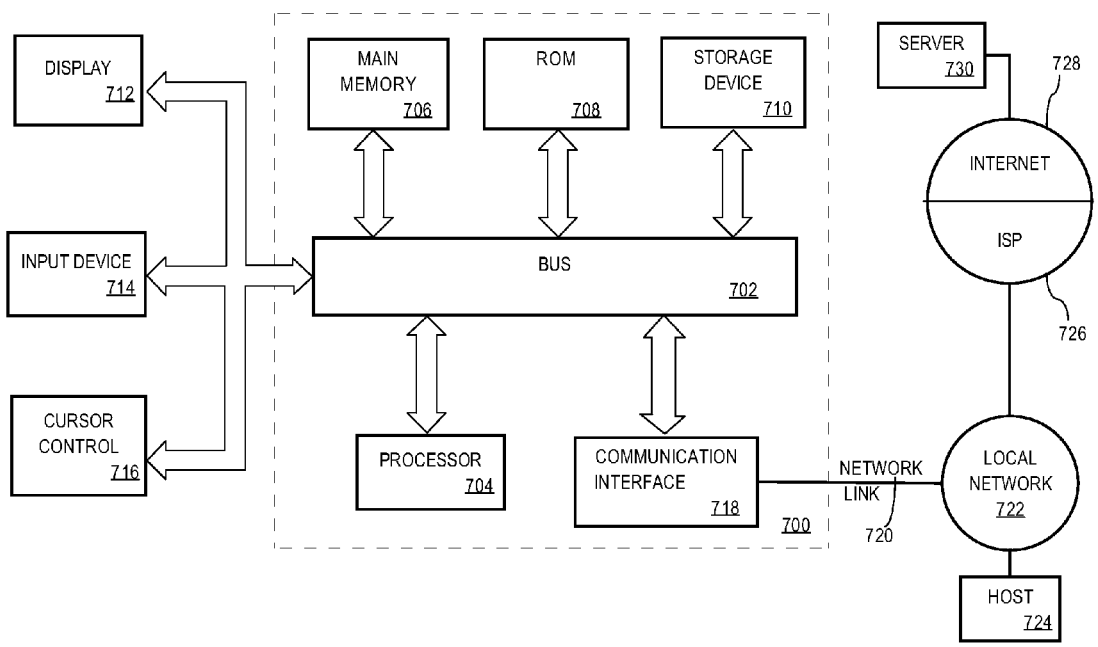
FIG. 7 is a block diagram that illustrates a computer system upon which an embodiment of the invention may be implemented.

In an embodiment, visual testing computer 130 may be implemented using any of the techniques further described herein in connection with FIG. 7; for example, the visual testing computer 130 may comprise a general-purpose computer configured with one or more stored programs which when executed cause performing the functions described herein for the intermediary computer, or a special-purpose computer with digital logic that is configured to execute the functions, or digital logic that is used in other computing devices.

2.3 Administrator Computer

Administrator computer 150 broadly represents any computer that may be used to manage, control, monitor or otherwise administrate a web site or a set of web pages. The particular role of a user of the computer is not critical and the label "administrator" is used here merely for convenience to illustrate a clear example. A user, such as an administrator for web infrastructure 105, may use administrator computer 150 to retrieve data from image and mask storage 140, configure web infrastructure 105, configure intermediary security module 110, and/or configure visual testing computer 130. Administrator computer may cause administration interface 170 to be displayed on a display, and respond to one or more user inputs received through administration interface 170.

Administration interface 170 may display images and/or masks stored in image and mask storage 140. Administration interface 170 may also display images from image and mask storage 140 indicating which page(s) may be visually broken. The administrator may determine which page(s), if any, are visually broken based on the images and masks presented through administration interface 170. Administration interface 170 may also provide controls for an administrator to update intermediary security module 110, such that intermediary security module 110 stops modifying one or more pages that intermediary security module 110 may be visually breaking by modifying the pages according to one or more security protocols.

2.4 Browser

A browser may be one or more computer programs or other software elements stored in electronic digital memory and executed on a computer that receives one or more pages from a server computer, performs one or more of the received instructions comprising each page, causes to display content, provides a user interface ("UI") to receive user inputs, and/or receives and responds to one or more inputs from a user based on or according to the one or more performed instructions. A browser and/or components of a browser may be implemented into an application. For example, a browser and/or components of a browser may be implemented into a standalone, web-based, and/or mobile application as part of a web view, and/or web view controller, to send and/or receive data over HTTP, SPDY, and/or other protocol(s). A user may use a browser to send data to a server computer. The server computer may respond with additional instructions.

Browser 195 may be a browser that is executed on client computer 199. Additionally or alternatively, browser 195 may be a browser operated by a user using client computer 199. Browser 195 may be configured to request, receive, and/or execute data from web infrastructure 105. For example, browser 195 may request, receive, and/or execute a web page comprising HTML, CSS, and/or JavaScript, and which when executed cause the web page, or a UI defined by the web page, to be displayed.

3.0 Process Overview

Discussed herein are systems and methods to determine whether a page is visually broken. Further discussed herein are systems and methods to automatically determine which pages, if any, in a plurality of web pages are visually broken.

3.1 Determining Whether a Page is Visually Broken

Figure 2:
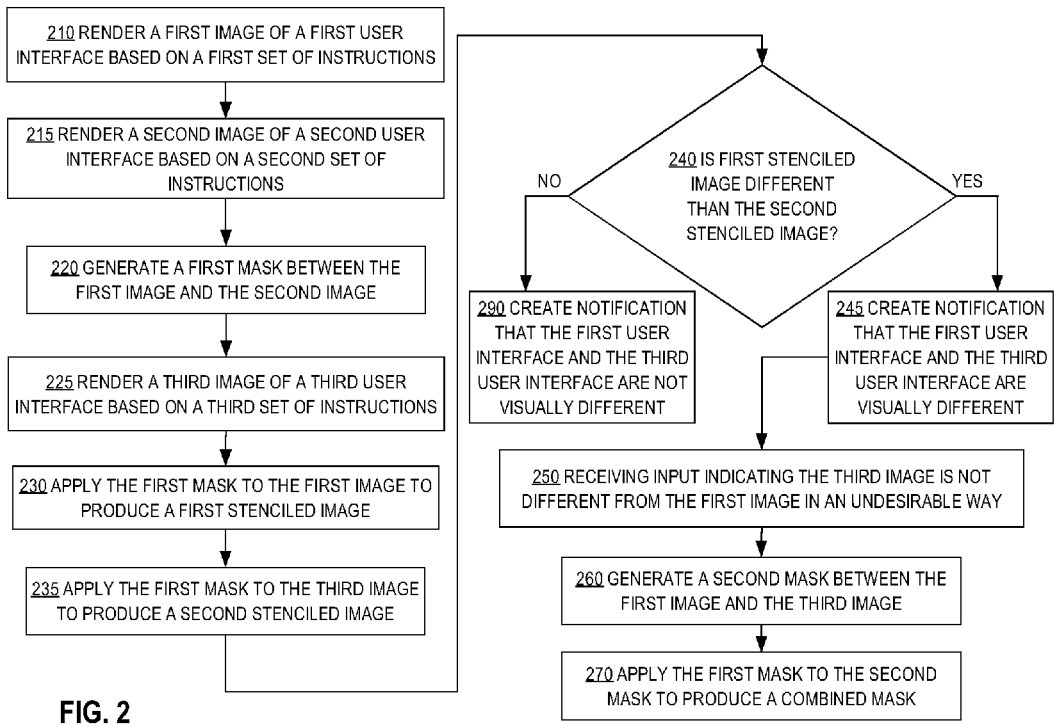
FIG. 2 illustrates a process for generating a mask, applying the mask to an image of a page, determining whether the page is visually broken, and updating the mask, in an example embodiment.
Figures 4A, 4B, 4C:
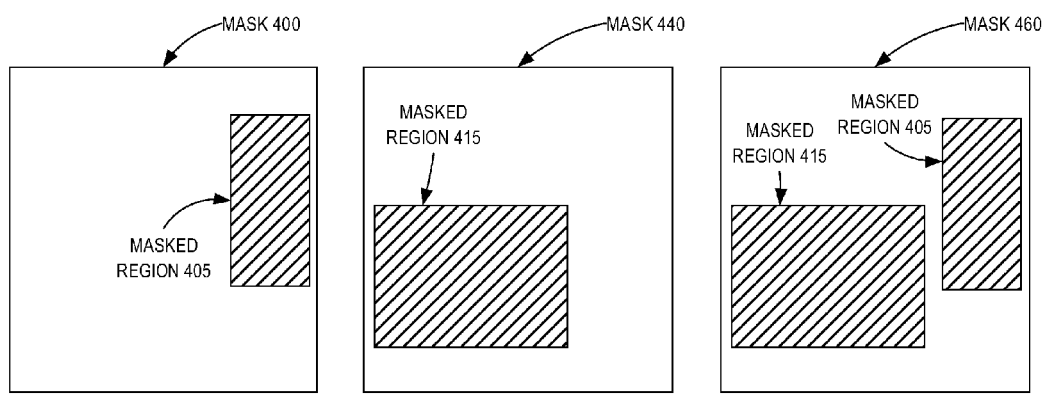
FIG. 4A, FIG. 4B, FIG. 4C each illustrate block diagram of a mask, in an example embodiment.
Figures 5A, 5B, 5C:
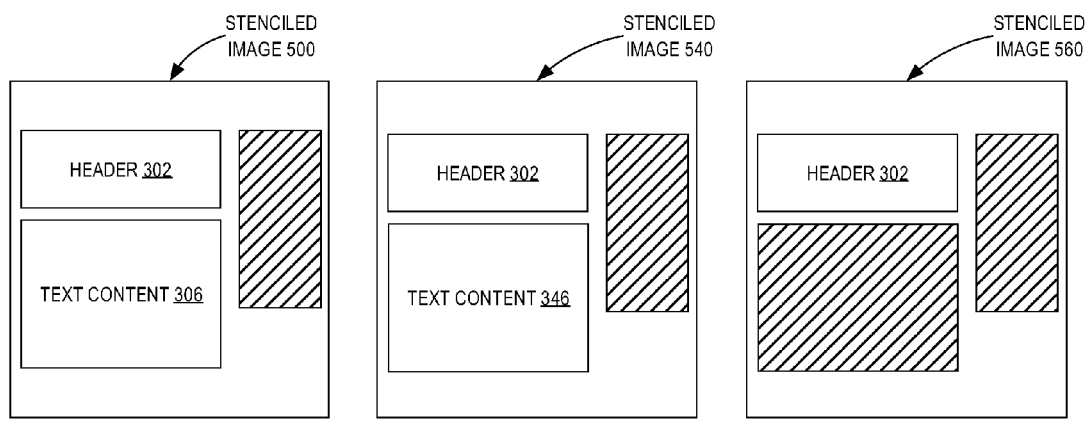
FIG. 5A, FIG. 5B, FIG. 5C each illustrate a stenciled image generated by applying a mask to an image, in an example embodiment.

FIG. 2 illustrates a process for generating a mask, applying the mask to an image of a page, determining whether the page is visually broken, and updating the mask, in an example embodiment. FIG. 3A, FIG. 3B, and FIG. 3C each illustrate block diagrams of a rendered image of a page, in an example embodiment. However, the content of each image may be different. For example, interface image 300 comprises header 302, ad 304, and text content 306. However, interface image 320, which may be a second rendering of the same page, comprises the same header and text content, but a different ad: ad 324. Interface image 340, which may be a third rendering of the same page, comprises the same header and ad as interface image 300, but different text content: text content 346. FIG. 4A, FIG. 4B, and FIG. 4C each illustrate block diagram of a mask, in an example embodiment. FIG. 5A, FIG. 5B, and FIG. 5C each illustrate a stenciled image generated by applying a mask to an image, in an example embodiment. Additionally or alternatively, FIG. 5A, FIG. 5B, and/or FIG. 5C may each be used as a mask.

3.1.1 Generating a Mask

Turning to FIG. 2, in step 210, a visual testing computer renders a first image of a first user interface based on a first set of instructions. For example, visual testing computer 130 may request a page from web infrastructure 105. In response, visual testing computer 130 may receive a first page. Visual testing computer 130 may render an image of the first page. For purposes of illustrating a clear example, assume that interface image 300 is the rendered image of the first page. In an embodiment, the images rendered may be caused to be rendered on one or more computers, such as client computer 195 by browser 190, and sent to visual testing computer 130 and/or image and mask storage 140.

In step 215, the visual testing computer renders a second image of a second user interface based on a set of instructions. For example, visual testing computer 130 may request the same page from web infrastructure 105. In response, visual testing computer 130 may receive a second, new page. The second page may comprise the same set of instructions as the first page or a different set of instructions as the first page. Visual testing computer 130 may render an image of the second page. For purposes of illustrating a clear example, assume that interface image 320 is the rendered image of the second page.

Instead of requesting the same page from web infrastructure 105, visual testing computer 130 may re-render the page received in step 210 to produce interface image 320. Visual testing computer 130 may render a different image of a page from the same set of instructions. For example, an ad and/or other content may change each time the same page is rendered.

In step 220, the visual testing computer generates a first mask between the first image and the second image. For example, visual testing computer 130 may generate mask 400. Visual testing computer 130 may generate mask 400 by subtracting interface image 300 from interface image 320. For example, visual testing computer 130 may generate mask 400 by subtracting the color from each point in a plurality of points in interface image 300 from a corresponding point in interface image 320.

A point in an image may be a particular location in an image. A point may, but need not, correspond to a picture element ("pixel") in the image. Each pixel may be assigned a color. Accordingly, the color at a particular point may be the color assigned to a pixel at and/or near the particular point in the image. Additionally or alternatively, the color at a particular point may be based on one or more pixels at and/or near the particular point in the image. For example, a color at a particular point may be a component-wise weighted sum of the colors at, and/or near, the particular point in the image.

A color may be subtracted by another color. A color may be represented as a vector of one or more values in a color space. For example, a color may be represented using the following vector notation: <R, G, B>. Some colors, such as a color in a black and white image may be a single value vector such as <I>, where I is equal to some intensity.

A first color may be subtracted by a second color by subtracting each component in the first vector by the corresponding component in the second vector. A difference color may be computed by subtracting a first color, <R1, G1, B1>, by a second color, <R2, G2, B2>. Thus, the difference color in this example may be <R1-R2, G1-G2, B1-B2>. While each component in a color vector may be defined in a color space wherein each component is greater than or equal to zero, one or more components of a difference color may be less than zero.

Subtracting an image from another may comprise scaling the images to be the same dimensions and/or converting each image to an intensity and/or greyscale image. For example, visual testing computer 130 may scale interface image 300 and interface image 320 to be the same size. Also for example, visual testing computer 130 may convert each color in interface image 300 and interface image 320 into a single value vector.

After visual testing computer 130 generates mask 400, mask 400 may indicate which regions of interface image 300 are different than interface image 320. For example, mask 400 comprises masked region 405, indicating that ad 304 in interface image 300 is different than ad 324 in interface image 320.

3.1.2 Determining Whether a Page is Visually Broken Using the Mask

In step 225, the visual testing computer renders a third image of a third user interface based on a third set of instructions. For example, visual testing computer 130 may request the same page from web infrastructure 105. In response, visual testing computer 130 may receive a third page, which is new version of the first page. The third page may comprise, and/or reference, one or more different instructions than the first page. Visual testing computer 130 may render an image of the third page. For purposes of illustrating a clear example, assume that interface image 340 is the rendered image of the third page.

In step 230, the visual testing computer applies the first mask to the first image to produce a first stenciled image. For example, visual testing computer 130 may apply mask 400 to interface image 300, to produce stenciled image 500. A mask may be applied in an image by removing the color data in the image that corresponds to a masked region in the mask. Thus, stenciled image 500 includes header 302 and text content 306, but not ad 304. Ad 304 was removed because masked region 405 in mask 400 masked out the region that included ad 304. Additionally or alternatively, the color data in the stenciled image that corresponds to a masked region may be set to the same color, such as black.

If a mask has a different dimension than the image the mask is applied to, then the mask may be scaled to have the same dimension. In an embodiment, the dimensions of each mask are normalized. Before the normalized mask is applied to an image, the mask is scaled to be the same dimensions as the image. Additionally or alternatively, an image of a page may be normalized and the normalized mask may be applied to the normalized image to produce a normalized stenciled image.

In step 235, the visual testing computer applies the first mask to the third image to produce a second stenciled image. For example, visual testing computer 130 may apply mask 400 to interface image 340 to produce stenciled image 540. In an embodiment, stenciled image 500 may be a mask. For example, the colors in stenciled image 500 may include a transparency channel, which indicates which region(s) in an interface image should be removed. Thus, based on the transparency values in stenciled image 500, visual testing computer 130 may apply stenciled image 500 to interface image 340 to produce stenciled image 540.

In step 240, the visual testing computer determines whether the first stenciled image is different than the second stenciled image. If so, then control may pass to step 245. Otherwise, control may pass to step 290. For example, visual testing computer 130 may determine whether stenciled image 500 is the same as stenciled image 540 by comparing the colors at one or more points in stenciled image 500 with the color at one or more corresponding points in stenciled image 540. For purposes of illustrating a clear example, assume text content 306 is different than text content 346. Visual testing computer 130 may determine that one or more points in stenciled image 500 are different than one or more points corresponding in stenciled image 540. Thus, visual testing computer 130 may determine that stenciled image 500 is different than stenciled image 540. Additionally or alternatively, visual testing computer 130 may determine that the third page is visually broken.

Additionally or alternatively, visual testing computer 130 may determine whether the interface image 300 is the same as interface image 340 by comparing the colors between one or more points in interface image 300 and one or more corresponding points in interface image 340, but not points that correspond with masked region 405 in mask 400.

In step 290, the visual testing computer creates a notification that the first user interface and the third user interface are not visually different. Additionally or alternatively, the visual testing computer may notify an administrator that the third page is not visually broken. For example, visual testing computer 130 may store data in image and mask storage 140 that the third page is not visually broken and/or the third user interface is not visually different from the first user interface after the mask is applied. An administrator may query image and mask storage to find pages that appear to be broken. Additionally or alternatively, a user using administrator computer 150 need not be alerted unless visual testing computer 130 determines that a page is visually broken.

In step 245, the visual testing computer creates a notification that the first user interface and the third user interface are visually different. For example, visual testing computer 130 may store data in image and mask storage 140 indicating that the third page is visually broken and/or the third user interface is visually different from the first user interface. An administrator may query for pages that have been determined to be visually broken. In response, administration interface 170 may present the interface image 340. Administration interface 170 may display interface image 340 with arrows, highlights, and/or other visual effects indicating which particular region(s) of interface image 340 caused visual testing computer 130 to determine that the user interface defined by instructions comprising the third page is visually broken. In an embodiment, the visual effects may be rendered, and/or caused to be rendered, on one or more computers, such as administrator computer 150 by administration interface 170, and sent to visual testing computer 130 and/or image and mask storage 140

3.1.3 Updating the Mask

In step 250, the visual testing computer receives input indicating the third image is not different from the first image in an unintended, unexpected, and/or undesirable way. Additionally or alternatively, the visual testing computer may receive input indicating that the third user interface is not visually broken. For example, an administrator, through administration interface 170 may indicate that although visual testing computer 130 determined that interface image 300 and interface image 340 were different, the difference was intended, expected, or acceptable. Additionally or alternatively, the administrator may indicate that the third user interface is not broken. The data indicating such may be stored in image and mask storage 140, and/or sent to visual testing computer 130, through administrator computer 150.

In step 260, the visual testing computer generates a second mask between the first image and the third image. For example, visual testing computer 130 may generate mask 440. Visual testing computer 130 may generate mask 440 by subtracting interface image 300 from interface image 340. After visual testing computer 130 generates mask 440, mask 440 may indicate which regions of interface image 300 are different than interface image 340. For example, mask 440 comprises masked region 415, indicating that text content 306 in interface image 300 is different than text content 346 in interface image 340.

In step 270, the visual testing computer applies the first mask to the second mask to produce a combined mask. For example, visual testing computer 130 may combine mask 400 and mask 440, to produce mask 460, such that any masked region in mask 400 or mask 440 remains a masked region in mask 460. Accordingly, mask 460 includes masked region 405 and masked region 415.

In the current example, if visual testing computer 130 applies mask 460 to interface image 300, interface image 320, and/or interface image 340, then visual testing computer 130 may produce stenciled image 560. Thus, using the combined mask, mask 460, visual testing computer 130 may determine that interface image 300 is equivalent to interface image 340, interface image 300 is not different than interface image 340, and/or that the third page is not visually broken.

Visual testing computer 130 may repeat one or more of the steps discussed herein to evolve a mask and/or a stencil. For example, visual testing computer 130 may re-request the first page and/or re-render an image of the first page, to produce a fourth rendered image. Visual testing computer 130 may perform one or more of the methods above to determine that the fourth image is different based, at least in part, on the combined mask. Visual testing computer 130 may use one or more of the methods discussed herein to update the combined mask based, at least in part, on the fourth image. Visual testing computer 130 may continue to evolve the combined mask as new images are rendered. Additionally or alternatively, visual testing computer 130 may evolve a stencil by the repeating one or more of the methods discussed herein.

Visual testing computer 130 may repeat one or more of the methods discussed herein to evolve a mask and/or stencil without receiving input from the user that an image is not visually broken. For example, visual testing computer 130 may request and/or render the same page 1,000 times. Visual testing computer 130 may determine that each rendered image is different and may use each different rendered image to update a mask and/or stencil. Visual testing computer 130 need not notify an administrator which of the images, if any, is different. Additionally or alternatively, visual testing computer 130 need not receive input from an administrator to update a mask and/or stencil.

In an embodiment, masks are normalized and then applied to each other. Additionally or alternatively, the dimensions of a first mask may be scaled to the dimensions of a second mask before the first mask is applied to the second mask.

3.2 Automatically Generating a Plurality of Masks and Determining which Pages are Visually Broken Visual testing computer 130 may test whether one or more pages, which are part of one or more web sites, are visually broken. For purposes of illustrating a clear example, assume that intermediary security module 110 is executed on a computer through which browsers may receive web pages from web infrastructure 105. Intermediary security module 110 may be configured by an administrator, through administration interface 170, to modify one or more of the web pages sent from web infrastructure 105 by implementing one or more security protocols. The administrator may intend for intermediary security module 110 to modify the functionality of the one or more pages, but not intend for intermediary security module 110 to visually break the one or more web pages. Accordingly, an administrator may use visual testing computer 130 to determine whether intermediary security module 110 may be visually breaking any of the pages it processes.

3.2.1 Rendering One or More Images of a Plurality of Pages

Figure 6:
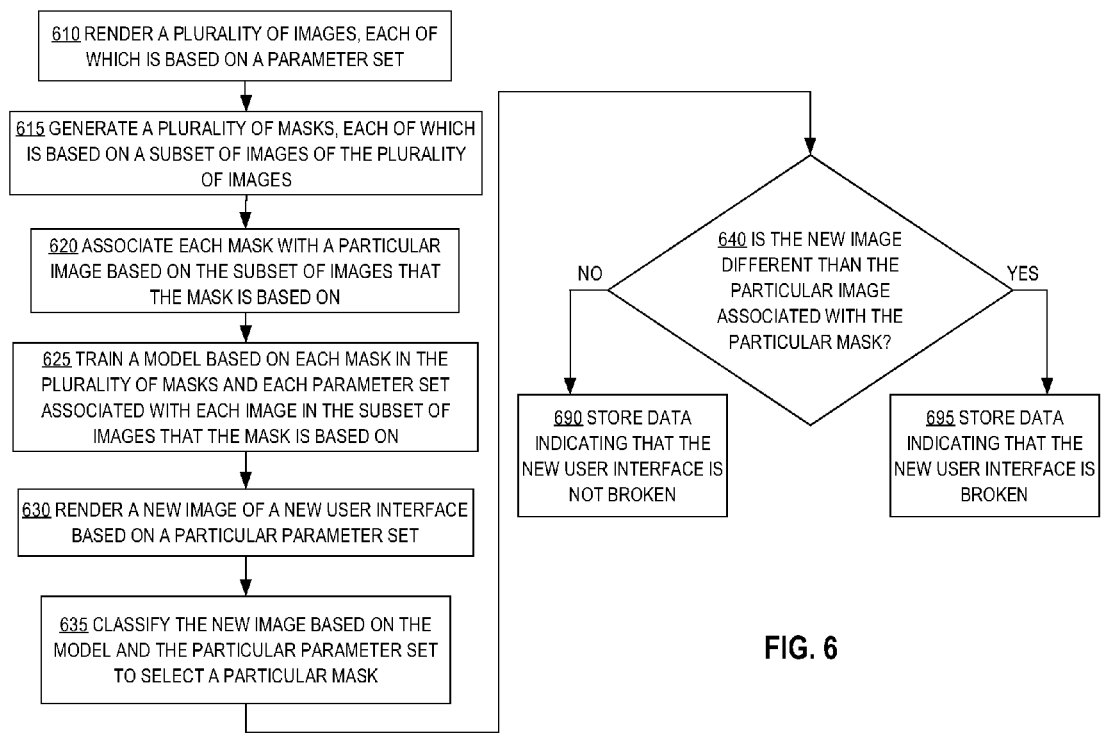
FIG. 6 illustrates a process for automatically generating a plurality of masks, selecting and applying a mask from a plurality of masks to render images of one or more pages, and determining which pages are visually broken, in an example embodiment.

FIG. 6 illustrates a process for automatically generating a plurality of masks, selecting and applying a mask from a plurality of masks to render images of one or more pages, and determining which pages are visually broken, in an example embodiment. In step 610, a visual testing computer renders a plurality of images, each of which is based on a parameter set. For example, visual testing computer 130 may request a plurality of pages from web infrastructure 105 without going through intermediary security module 110. Each request may be based on logs stored in log storage 107. In response to the requests, visual testing computer 130 may receive and render the pages from web infrastructure 105. Visual testing computer 130 may store the rendered images in image and mask storage 140.

Visual testing computer 130 may render each page based on the parameters stored in the logs. For example, if a first log entry includes data that indicates a particular page was requested by a client computer that had a display with a first particular dimension, then visual testing computer 130 may render the page at the first particular dimension. If a second log entry includes data that indicates the particular page was requested by a client computer that had a display with a second particular dimension, then visual testing computer 130 may render the page again based on the second particular dimension.

Visual testing computer 130 may render each page based on one or more other parameters. For example, visual testing computer 130 may be configured to render the same page at one or more particular dimensions, regardless of data stored in log storage 107.

Also for example, if a first log entry includes data that indicates a particular page was requested in English by a client computer, then visual testing computer 130 may request the page in English and render the returned page. And, if a second log entry includes data that indicates the particular page was requested in French by a client computer, then visual testing computer 130 may request the page in French and render the returned page.

Visual testing computer 130 may render the same page multiple times. Additionally or alternatively, visual testing computer 130 may request the same page multiple times and render the returned page one or more times. As discussed herein, the same page may be rendered differently each time it is rendered. For example, a page that lists breaking news may have content that changes over time. Also for example, a user profile page may be requested several times, each request may include a parameter for a different user. Each profile page returned may include different data for the corresponding user, such as a biography and pictures.

3.2.2 Generating a Plurality of Masks

In step 615, the visual testing computer generates a plurality of masks, each of which is based on a subset of images of the plurality of images. For example, visual testing computer 130 may group renderings with one or more matching parameters into the same subset and generate a combined mask based on each image in the subset. One example subset may include renderings of the same news page. Another example subset may include renderings of the same news page, but rendered and/or requested at different times. Another example subset may include renderings of the same news page associated with a particular user interface version. Another example subset may include renderings of the same news page, with parameters indicating each page was requested from a particular geographic location. Visual testing computer 130 may group a rendered image into one or more subsets. Visual testing computer 130 may store the rendered masks in image and mask storage 140.

Visual testing computer 130 may generate complementary subsets. For example, visual testing computer 130 may generate a subset comprising a group of renderings of the same news page with one or more parameters indicating that each page was requested in English. Visual testing computer 130 may generate a complementary subset comprising a group of renderings of the same news page without one or more parameters indicating that each page was requested in English, and/or with one or more parameters indicating that each page was request in a different language than English.

In step 620, the visual testing computer associates each mask with a particular image based on the subset of images that the mask is based on. For example, the visual testing computer 130 may pick a first image, which is in a first subset of images used to generate a first mask, and associate the first image with the first mask. Similarly, the visual testing computer 130 may pick a second image, which is in a second subset of images used to generate a second mask, and associate the second image with the second mask. Visual testing computer 130 may store each association in image and mask storage 140.

Additionally or alternatively, visual testing computer 130 may create a first stenciled image with the first image and the first mask, and a second stenciled image with the second image and the second mask. Additionally or alternatively, if the first mask is a stenciled image and the second mask is a stenciled image, then visual testing computer 130 need not perform step 620.

3.2.3 Training a Model to Classify Pages and/or One or More Rendered Images of a Page In step 625, the visual testing computer trains a model based on each mask in the plurality of masks and each parameter set associated with each image in the subset of images that the mask is based on. For example, visual testing computer 130 may generate a multi-tier neural network, with three or more tiers. Visual testing computer 130 may generate the neural network based on each mask in the plurality of masks, and the parameters associated with each image that is associated with, and/or used to generate, the mask. Additionally or alternatively, visual testing computer 130 may generate a model for classifying masks comprising a set of weights based on logistical regression. Additionally or alternatively, visual testing computer 130 may generate any other model to classify masks. Using the model, visual testing computer 130 may select a mask based on one or more parameters associated with a page.

3.2.4 Rendering One or More Images of a Plurality of Modified Pages

In step 630, the visual testing computer 130 may generate a new image of a new user interface based on a particular parameter set. For example, an administrator through administration interface 170 and/or administrator computer 150 may instruct visual testing computer 130 to request one or more of the same pages requested in step 610 through intermediary security module 110. In response, visual testing computer 130 may request each page of the one or more pages requested in step 610 through intermediary security module 110. Visual testing computer 130 may request each page through intermediary security module 110 using one or more of the same parameters for the page as in step 610. Accordingly, intermediary security module 110 may modify each page visual testing computer 130 receives. Visual testing computer 130 may render a new image of each new page.

3.2.5 Selecting a Mask for Each Rendered Image of a Page Based on the Model

In step 635, the visual testing computer selects a particular mask for the new image by classifying the new image based on the model. For example, for each new image rendered in step 630, visual testing computer 130 may select a particular mask based on the model and one or more of the parameters associated with the rendered image and/or the corresponding page.

3.2.6 Determining Whether a Modified Page is Broken Based on the One or More Rendered Images of the Modified Page In step 640, the visual testing computer determines whether the new image is different than, or not equivalent to, the particular image associated with the particular mask. If not, control passes to step 690. Otherwise, control passes to step 695. For example, for each new image rendered in step 630, visual testing computer may apply one or of the methods discussed above to determine whether the new image is equivalent to, the image associated with the mask selected in step 635.

In step 690, the visual testing computer stores data indicating that the new user interface is not broken. For example, for each new image rendered in step 630 that visual testing computer 130 determines is not visually broken in step 640, visual testing computer 130 may store data in image and mask storage 140 indicating that the new image is equivalent. Additionally or alternatively, the data may indicate that the new page, and/or the user interface defined by the new page, is not visually broken.

In step 695, the visual testing computer stores data indicating that the new user interface is broken. For example, for each new image rendered in step 630 that visual testing computer 130 may store data in image and mask storage 140 indicating that the new image is different. Additionally or alternatively, the data may indicate that the new page, and/or the user interface defined by the new page, is visually broken.

3.2.7 Automatically Updating One or More Masks

As discussed herein, a page may be rendered more than once. Visual testing computer 130 may determine that a first set, or "unbroken set", of one or more rendered images indicate that the page is not visually broken. However, visual testing computer 130 may also determine that a second set, or "broken set", of one or more rendered images indicate that the page is visually broken. For each image in the broken set of images, visual testing computer 130 may update the corresponding mask based on the image using one or more of the methods discussed herein.

Visual testing computer 130 may automatically update the mask(s) that correspond to the image(s) in a broken set if the number of images in corresponding unbroken set is greater than the number of images in the broken set. Additionally or alternatively, visual testing computer 130 may automatically update the mask(s) that correspond to the image(s) in a broken set if the number of images in the unbroken set is equal to or greater than a particular threshold. Additionally or alternatively, visual testing computer 130 may automatically update the mask(s) that correspond to the image(s) in a broken set if the number of images in the broken set is less than or equal to a particular threshold. Additionally or alternatively, visual testing computer 130 may automatically update the mask(s) that correspond to the image(s) in a broken set if at list one image is included in a corresponding unbroken set.

Visual testing computer 130 may update one or more masks based on a particular page in response to receiving instruction(s) to do so from an administrator through administration interface 170. For example, using one or more of the methods discussed herein, an administrator may review an image that caused the visual testing computer 130 to determine that a page was visually broken. If the administrator determines that the page was not visually broken, then the administrator may send one or more instructions to visual testing computer 130 to update the corresponding mask. In response, visual testing computer 130 may update the mask based on the image.

3.2.8 Modifying the Behavior of the Web Infrastructure

If an administrator, using one or more of the methods discussed herein determines that intermediary security module 110 is visually breaking a page, then the administrator may instruct intermediary security module 110 to stop modifying the page through administration interface 170 and/or administrator computer 150. For example, intermediary security module 110 may use a configuration file to determine which pages, if any, to modify. An administrator may update the configuration file to indicate that intermediary security module 110 should not modify a particular page. Accordingly, intermediary security module 110 may not modify the page each time the page is requested through intermediary security module 110. Additionally or alternatively, an administrator may update the configuration file to indicate which one or more protocols that intermediary security module 110 should use, and/or should not use, to modify a particular page.

4.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

5.0 Other Aspects of Disclosure

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A data processing method comprising:
    rendering a first image of a first user interface based on a first set of instructions;
    rendering a second image of a second user interface based on a second set of instructions;
    generating a first mask comprising a plurality of points, wherein each point in the first mask indicates whether a first point in the first image and a second point in the second image are different;
    rendering a third image of a third user interface based on a third set of instructions, wherein the first set of instructions are different than the third set of instructions and the first image is different than the third image;
    determining that the first image is equivalent to the third image based on the first image, the first mask, and the third image;
    wherein the method is performed by one or more computing devices.

2. The method of claim 1 further comprising:
    applying the first mask to the first image to produce a first stenciled image;
    applying the first mask to the third image to produce a second stenciled image;
    wherein determining that the first image is equivalent to the third image is based on determining that the first stenciled image is not different than the second stenciled image.

3. The method of claim 2 further comprising:
    normalizing the first mask to produce a first normalized mask;
    normalizing the first image to produce a first normalized image;
    normalizing the third image to produce a second normalized image;
    wherein applying the first mask to the first image to produce the first stenciled image comprises applying the first normalized mask to the first normalized image, wherein the first stenciled image produced is normalized;
    wherein applying the first mask to the third image to produce the second stenciled image comprises applying the first normalized mask to the second normalized image, wherein the second stenciled image produced is normalized.

4. The method of claim 1 further comprising generating a notification indicating that the first user interface and the third user interface are not visually different in response to determining that the first image is equivalent to the third image.

5. The method of claim 1 further comprising:
    rendering a fourth image of a fourth user interface based on a fourth set of instructions, wherein the first set of instructions are different than the fourth set of instructions and the first image is different than the fourth image;
    determining that the first image and the fourth image are not equivalent based on the first image, the first mask, and the fourth image;
    in response, generating a notification indicating that the first user interface and the fourth user interface are visually different.

6. The method of claim 5 further comprising:
    applying the first mask to the first image to produce a first stenciled image;
    applying the first mask to the fourth image to produce a third stenciled image;
    wherein determining that the first image and the fourth image are not equivalent is based on determining that the first stenciled image is different than the third stenciled image.

7. The method of claim 6 further comprising:
    highlighting one or more regions of the fourth image to produce a highlighted image, wherein the one or more regions of the highlighted image correspond to regions of the third stenciled image that are different than the first stenciled image;
    causing displaying of the highlighted image on a display.

8. The method of claim 5 further comprising:
    receiving input indicating the fourth image is not different from the first image in an undesirable way;

generating a second mask between the first image and the fourth image;

applying the first mask to the second mask to produce a combined mask;

rendering a fifth image of a fifth user interface based on a fifth set of instructions, wherein the first set of instructions are different than the fifth set of instructions and the first image is different than the fifth image;

determining that the fifth image is equivalent to the first image based on the first image, the combined mask, and the fifth image; and in response, indicating that the first user interface and the fifth user interface are not visually different.

9. The method of claim 1 further comprising:

rendering a plurality of images, wherein each image in the plurality of images is based on a corresponding parameter set, of a plurality of parameter sets, wherein each parameter set of the plurality of parameter sets comprises of one or more parameters;

generating a plurality of masks that include the first mask, wherein each mask in the plurality of masks is based on a subset of images of the plurality of images, and images in the subset of images have matching parameter sets;

training a model based on each mask in the plurality of masks and each parameter set associated with each image in the subset of images that the mask is based on;

wherein rendering the third image is based on a third parameter set;

wherein determining that the first image is equivalent to the third image comprises classifying the third image, based on the model and the third parameter set, as belonging to the subset of images that the first mask is based on.

10. The method of claim 9 wherein classifying the third image is further based on a one-versus-all method.

11. The method of claim 9, wherein:

the model is a multi-tier neural network; and classifying the third image as belonging to the subset of images that the first mask is based on the multi-tier neural network and the third parameter set.

12. The method of claim 9 further comprising:

rendering a fourth image of a fourth user interface based on a fourth parameter set and a fourth set of instructions, wherein the first set of instructions are different than the fourth set of instructions and the first image is different than the fourth image;

classifying the fourth image, using the model and the fourth parameter set, as belonging to the subset of images that the first mask is based on, and in response:

determining that the first image is not equivalent to the fourth image based on the first image, the first mask, and the fourth image;

in response, indicating that the first user interface and the fourth user interface are visually different.

13. The method of claim 9 further comprising generating at least one parameter set of the plurality of parameter sets from one or more logs generated in response to a plurality of requests for one or more web pages.

14. The method of claim 9 further comprising, for each mask in the plurality of masks: generating a stenciled image based on one or more images from the subset of images that the mask is based on.

15. The method of claim 1 further comprising applying a section mask to the first mask, wherein the section mask corresponds to a particular section of the first user interface and masks out all other sections of the first user interface.

16. A computer system comprising:
a processor;
a memory;
a visual testing module configured to:
render a first image of a first user interface based on a first set of instructions;
render a second image of a second user interface based on a second set of instructions;
generate a first mask comprising a plurality of points, wherein each point in the first mask indicates whether a first point in the first image and a second point in the second image are different;
render a third image of a third user interface based on a third set of instructions, wherein the first set of instructions are different than the third set of instructions and the first image is different than the third image;
determine that the first image is equivalent to the third image based on the first image, the first mask, and the third image.

17. The computer system of claim 16, wherein the visual testing module is further configured to:
apply the first mask to the first image to produce a first stenciled image;
apply the first mask to the third image to produce a second stenciled image;
determine that the first image is equivalent to the third image comprises based on determining that the first stenciled image is not different than the second stenciled image.

18. The computer system of claim 17, wherein the visual testing module is further configured to:
normalize the first mask to produce a first normalized mask;
normalize the first image to produce a first normalized image;
normalize the third image to produce a second normalized image;
apply the first mask to the first image to produce the first stenciled image by applying the first normalized mask to the first normalized image, wherein the first stenciled image produced is normalized;
apply the first mask to the third image to produce the second stenciled image by applying the first normalized mask to the second normalized image, wherein the second stenciled image produced is normalized.

19. The computer system of claim 16, wherein the visual testing module is further configured to generate a notification indicating that the first user interface and the third user interface are not visually different in response to determining that the first image is equivalent to the third image.

20. The computer system of claim 16, wherein the visual testing module is further configured to:
render a fourth image of a fourth user interface based on a fourth set of instructions, wherein the first set of instructions are different than the fourth set of instructions and the first image is different than the fourth image;
determine that the first image and the fourth image are not equivalent based on the first image, the first mask, and the fourth image;
in response, generate a notification indicating that the first user interface and the fourth user interface are visually different.

21. The computer system of claim 20, wherein the visual testing module is further configured to:
apply the first mask to the first image to produce a first stenciled image;

apply the first mask to the fourth image to produce a third stenciled image;
determine that the first image and the fourth image are not equivalent based on determining that the first stenciled image is different than the third stenciled image.

22. The computer system of claim 21 further comprising:
a user computer;
a display coupled to the user computer;
wherein the visual testing module is further configured to highlight one or more regions of the fourth image to produce a highlighted image, wherein the one or more regions of the highlighted image correspond to regions of the third stenciled image that are different than the first stenciled image;
wherein the user computer is configured to cause displaying the highlighted image on the display.

23. The computer system of claim 20 further comprising:
an user computer with a user interface configured to receive input indicating the fourth image is not different from the first image in an undesirable way;
wherein the visual testing module is further configured to generate a second mask between the first image and the fourth image;
apply the first mask to the second mask to produce a combined mask;
render a fifth image of a fifth user interface based on a fifth set of instructions, wherein the first set of instructions are different than the fifth set of instructions and the first image is different than the fifth image;
determine that the fifth image is equivalent to the first image based on the first image, the combined mask, and the fifth image; and
in response, indicate that the first user interface and the fifth user interface are not visually different.

24. The computer system of claim 16, wherein the visual testing module is further configured to:
render a plurality of images, wherein each image in the plurality of images is based on a corresponding parameter set, of a plurality of parameter sets, wherein each parameter set of the plurality of parameter sets comprises of one or more parameters;
generate a plurality of masks that include the first mask, wherein each mask in the plurality of masks is based on a subset of images of the plurality of images, and images in the subset of images have matching parameter sets;
train a model based on each mask in the plurality of masks and each parameter set associated with each image in the subset of images that the mask is based on;
render the third image based on a third parameter set;
classify the third image, based on the model and the third parameter set, as belonging to the subset of images that the first mask is based on.

25. The computer system of claim 24, wherein classifying the third image is based on a one-versus-all method.

26. The computer system of claim 24, wherein:
the model is a multi-tier neural network;
classifying the third image is based on the multi-tier neural network and the third parameter set.

27. The computer system of claim 24, wherein the visual testing module is further configured to:
render a fourth image of a fourth user interface based on a fourth parameter set and a fourth set of instructions, wherein the first set of instructions are different than the fourth set of instructions and the first image is different than the fourth image;
classify the fourth image, using the model and the fourth parameter set, as belonging to the subset of images that the first mask is based on, and in response:
determine that the first image is not equivalent to the fourth image based on the first image, the first mask, and the fourth image;
in response, indicate that the first user interface and the fourth user interface are visually different.

28. The computer system of claim 24 further comprising:
a log storage configured to store one or more logs based on a plurality of requests for one or more web pages;
wherein the visual testing module is further configured to generate at least one parameter set of the plurality of parameter sets from the one or more logs in the log storage.

29. The computer system of claim 24, wherein the visual testing module is further configured to, for each mask in the plurality of masks, generate a stenciled image based on one or more images from the subset of images that the mask is based on.

30. The computer system of claim 16, wherein:
the visual testing module is further configured to apply a section mask to the first mask;
the section mask corresponds to a particular section of the first user interface and masks out all other sections of the first user interface.

* * * * *